Patented Aug. 6, 1935

2,010,192

UNITED STATES PATENT OFFICE 2,010,192

PROCESS OF PREPARING MUSCLE ADENYLIC ACID

Carl Ludwig Lautenschläger and Fritz Lindner, Frankfort-on-the-Main, Germany, assignors to Winthrop Chemical Company, Inc., New York, N. Y., a corporation of New York No Drawing. Application March 10, 1933, Serial No. 660,304. In Germany March 12, 1932

7 Claims. (Cl. 260—34)

The present invention relates to a process of preparing muscle adenylic acid.

As is known the muscle adenylic acid is not contained as such in the animal tissues, but is combined with pyrophosphoric acid to form so-called adenyl-pyrophosphoric acid or adenosinetriphosphoric acid. In the hitherto known processes for making the muscle adenylic acid either the latter is formed from the adenosinetriphosphoric acid only in the course of the operations comprising a series of precipitations with the aid of heavy metal salts, or the adenosinetriphosphoric acid is first separated in the form of precipitates of heavy metal salts and then subjected to a special cleaving process. All these known processes are too complicated and expensive for commercial use on account of the necessary metal salt precipitations. Moreover, in decomposing the metal salt of adenylic acid with hydrogen sulfide much loss of adenylic acid absorption by the metal sulfide precipitates cannot be avoided.

Now we have found that the muscle adenylic acid can be obtained in a simple manner by adding an alkaline-earth metal hydroxide to an extract containing muscle adenyl-pyrophosphoric acid, heating the alkaline-earth metal salt of muscle-adenylpyrosphosphoric acid thus obtained in the presence of an alkaline-earth metal hydroxide and filtering off the precipitated insoluble alkaline-earth metal phosphates. The albumin-free extract used as starting material may, for instance, be obtained from fresh tissues in known manner (see for instance "Zeitschrift für Biologie" 91 (1931) page 315 et seq.) or by extracting animal tissue with trichloroacetic acid while cooling. This extract is rendered alkaline by adding alkaline-earth metal hydroxides, such as calcium hydroxide, barium hydroxide or strontium hydroxide; the mixture is heated for some time, whereby besides the formation of adenylic acid also destruction of the deamidizing ferments occurs. The inorganic alkaline-earth metal phosphate formed is then eliminated, for instance by filtering or centrifuging, and the adenylic acid is separated in known manner from the solution obtained with the aid of heavy metal salts. This separation is, for instance, described in the article above referred to as well as in "Zeitschrift für physiologische Chemie" 167 (1927) page 137 and 179 (1928) page 149. For precipitating the adenylic acid there is preferably used a heavy metal salt the metal ion of which can be eliminated from the precipitate consisting of the heavy metal salt of adenylic acid without the aid of hydrogen sulfide. For instance lead acetate is used and the lead salt of the adenylic acid is decomposed by means of sulfuric acid.

The process may be carried out by extracting fresh brawn with a solution of trichloroacetic acid, rendering the solution obtained alkaline with milk of lime, heating it for some time to a temperature between about 50° C. and about 100° C., for instance almost to the boiling point, and then precipitating the inorganic phosphate by addition of barium acetate. The duration of heating depends upon the alkaline-earth metal hydroxide employed as well as on the temperature applied; it varies between about 10 minutes and about 10 hours. From the filtrate the adenylic acid is precipitated by means of lead acetate and the precipitate is decomposed with sulfuric acid. From the filtrate of lead sulfate the adenylic acid can be obtained in known manner, for instance as described in the literature reference above referred to.

By another procedure, the crude extracts are made alkaline with an alkaline-earth metal hydroxide, for instance barium hydroxide, from a solution of a concentration as high as possible; the precipitate containing the barium salt of adenosinetriphosphoric acid is separated and converted into the barium salt of adenylic acid by heating it in an aqueous suspension. The adenylic acid is further purified as above described by preparing, separating and decomposing a heavy metal salt.

The yield amounts on an average to 0.5 gram of muscle adenylic acid per 1 kilo of fresh meat.

The following examples illustrate the invention:

(1) 1 kilo of muscle from a horse which has just been slaughtered is minced in a mincing machine cooled with ice and is introduced directly into 2 liters of a 10 per cent. solution of trichloroacetic acid pre-cooled to 0°; the whole is thoroughly stirred for half an hour while cooling and then well filter-pressed; the filtrate is made alkaline to phenolphthalein by adding milk of lime, then heated to 90° C. to 100° C. for 5 hours and then rapidly cooled to room temperature. A 20 per cent. solution of barium acetate is added until no further precipitation occurs and the whole is filtered. To the filtrate is added a solution of lead acetate, the precipitate is thoroughly washed and then decomposed by triturating it with sulfuric acid. The solution is separated from the lead sulfate, quantitatively freed from an excess of sulfuric acid and concentrated in a vacuum until crystallization begins. By cautiously adding alcohol or acetone the muscle adenylic acid is completely precipitated in the form of crystals.

(2) 1 kilo of heart muscle from a horse just killed is treated as described in Example 1. The trichloroacetic acid solution obtained is mixed with caustic soda solution until the reaction is negative to Congo, then filtered through kieselguhr to obtain a clear solution, rendered just alkaline to phenol-phthalen by means of a solution of barium hydroxide and the precipitation completed by adding a solution of barium acetate. The precipitate is separated and suspended in water; the suspension is mixed, if necessary, with such a quantity of a barium hydroxide solution that the reaction is distinctly alkaline to phenolphthalein and then heated and worked up as described in Example 1. Instead of barium hydroxide and barium acetate there can also be used strontium hydroxide and strontium acetate.

(3) 10 kilos of brawn from an animal just killed are minced in a cooled mincing machine and received in 10 liters of a pre-cooled 10 per cent. solution of trichloroacetic acid. The mixture is stirred for one hour while cooling and well squeezed off in a hydraulic press. The expressed juice is filtered through kieselguhr to produce a clear solution which is then neutralized with a caustic soda solution; 10 grams of calcium hydroxide are introduced for each liter of solution and centrifuging immediately follows. The precipitate is suspended in 5 liters of water and the suspension is heated for 3 hours on the steam bath while stirring. After cooling to room temperature, oxalic acid is added until the filtrate from a test portion just gives no further turbidity on addition of a further quantity of oxalic acid. After filtering with suction, the filtrate is made alkaline to phenolphthalein by adding barium hydroxide and the precipitate is filtered. The barium is eliminated from the filtrate by means of sulfuric acid. The filtrate is concentrated in a vacuum until the crystallization sets in and is allowed to stand in the cold whereby pure muscle adenylic acid is crystallized.

We claim:

1. In the process of preparing muscle adenylic acid from animal tissue the steps which comprise adding an alkaline-earth metal hydroxide to an extract containing muscle adenyl-pyrophosphoric acid, heating the alkaline-earth metal salt of muscle-adenylpyrophosphoric acid thus obtained in the presence of an alkaline-earth metal hydroxide.

2. In the process of preparing muscle adenylic acid from animal tissue the steps which comprise adding an alkaline-earth metal hydroxide to an extract containing muscle-adenylpyrophosphoric acid obtained by extracting muscles by means of trichloroacetic acid, heating the alkaline-earth metal salt of muscle-adenyl-pyrophosphoric acid thus obtained in the presence of an alkaline-earth metal hydroxide.

3. In the process of preparing muscle adenylic acid from animal tissues the steps which comprise adding an alkaline-earth metal hydroxide to an extract containing muscle-adenyl-pyrophosphoric acid, heating the alkaline-earth metal salt of muscle-adenyl-pyrophosphoric acid thus obtained for about 10 minutes to about 10 hours at a temperature of about 50° C. to about 100° C. in the presence of an alkaline-earth metal hydroxide.

4. In the process of preparing muscle adenylic acid from animal tissue the steps which comprise adding an alkaline-earth metal hydroxide to an extract containing muscle-adenyl-pyrophosphoric acid obtained by extracting muscles by means of trichloroacetic acid, heating the alkaline-earth metal salt of muscle-adenyl-pyrophosphoric acid thus obtained for about 10 minutes to about 10 hours at a temperature of about 50° C. to about 100° C. in the presence of an alkaline-earth metal hydroxide.

5. In the process of preparing muscle adenylic acid from animal tissue the steps which comprise adding an alkaline-earth metal hydroxide to an extract containing muscle-adenyl-pyrophosphoric acid obtained by extracting muscles by means of trichloroacetic acid, heating the alkaline-earth metal salt of muscle-adenyl-pyrophosphoric acid thus obtained for about 10 minutes to about 10 hours at a temperature of about 50° C. to about 100° C. in the presence of an alkaline-earth metal hydroxide, precipitating the insoluble alkaline-earth metal phosphates by adding a water-soluble alkaline-earth metal salt and filtering the mixture, adding a water-soluble lead salt to the filtrate and isolating the muscle adenylic acid from its lead salt thus obtained.

6. In the process of preparing muscle adenylic acid from animal tissue the steps which comprise extracting fresh muscles with trichloroacetic acid at a temperature of about 0° C., rendering alkaline the extract by adding calcium hydroxide, heating the alkaline extract at a temperature of about 90° C. to about 100° C. for about 5 hours, adding barium acetate to the cool mixture, filtering, precipitating the lead salt of the muscle adenylic acid by adding lead acetate to the filtrate and isolating the muscle adenylic acid by causing sulfuric acid to act upon the said lead salt.

7. In the process of preparing muscle adenylic acid from animal tissue the steps which comprise extracting fresh muscles with trichloroacetic acid at a temperature of about 0° C., rendering alkaline the extract by adding sodium hydroxide, adding calcium hydroxide to the alkaline extract, isolating the precipitate thus obtained, heating an aqueous suspension of said precipitate in the presence of calcium hydroxide at a temperature of about 100° C. for about 3 hours, filtering and isolating the muscle adenylic acid from the filtrate by adding sulfuric acid, filtering off the alkaline-earth metal sulfate and evaporating the filtrate thus obtained.

CARL LUDWIG LAUTENSCHLÄGER.
FRITZ LINDNER.